C. T. STEPHENS.
Meat-Tenderers.
No. 198,755.    Patented Jan. 1, 1878.
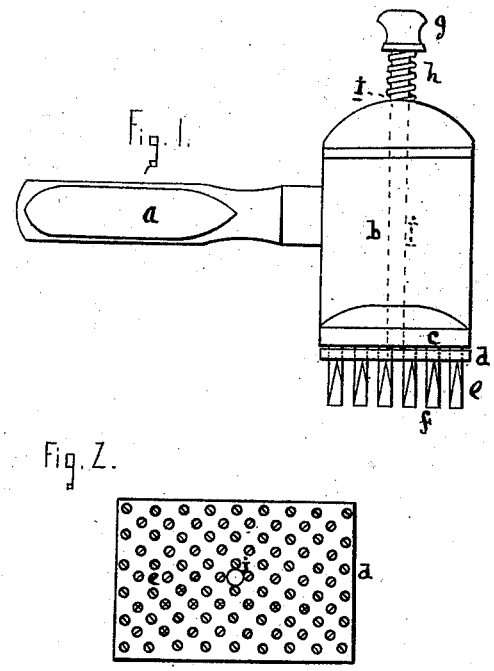

UNITED STATES PATENT OFFICE.

CLEMENTS T. STEPHENS, OF ITHACA, NEW YORK.

IMPROVEMENT IN MEAT-TENDERERS.

Specification forming part of Letters Patent No. 198,755, dated January 1, 1878; application filed October 27, 1877.

*To all whom it may concern:*

Be it known that I, CLEMENTS T. STEPHENS, of Ithaca, Tompkins county, New York, have invented an Improved Device for Mauling, or Making Tender, Meat, of which the following is a specification, reference being had to the accompanying drawings.

My invention relates to the construction of a mallet with teeth or knives, and to their arrangement, and to the means of keeping clean these teeth or knives when so arranged that the slices of meat may be cut into fine portions, the pieces of meat retaining their original shape, after they have been subjected to the premasticating action of the instrument I have invented.

Referring to the drawings, Figure 1 is a side elevation of my meat-mallet, and Fig. 2 is a view of the base of my mallet.

In the figures, $a$ is the handle of the mallet, fitting at right angles into the head or weight $b$, which mallet-head is, preferably, made of wood, and with a rounded top, and an oblong, rectangular, or square base. To this lower part or base is fitted the tooth-holding plate $c$, which may be either of wood or metal, into which the teeth or knives are secured. A piece of hard wood has advantages, as the teeth or knives are less liable to break, they being made of hardened steel.

Below the plate $c$ is a movable cleaning-plate, $d$, that fits loosely about the teeth, and then the teeth or knives $e$ are seen projecting below the plates $c$ and $d$ sufficiently to go through the steak or other form into which the meat is cut. This cleaning-plate $d$ is fast to a rod, $i$, that extends from the plate upward through plate $c$ and head $b$, lying loosely in an aperture made for it. About it, and just above the mallet-head $b$, is the spring $h$, and above that is the hand-knob $g$.

It will be noticed that, by a blow or pat of the hand on the knob, the cleaning-plate slides down to the ends of the teeth, and pushes off of the teeth any particles of meat, or other parts or juices of the meat that by use accumulate between the teeth, which cleaning rapidly is very useful for my implement, which premasticates the meat.

The teeth $e$ are seen to be round, and with chisel-edges $f$, like the incisor-teeth of the human jaw-bone.

It will also be seen that the teeth are shown in the row seen in Fig. 1 as set obliquely. Beyond this row are other rows, but they are not even indicated in Fig. 1, lest the attempt to show them should confuse the drawings; but in Fig. 2, which is a view looking down into them, in the base of the mallet, the rows are seen, and their quincunx arrangement. The lines run parallel to the sides of the base of the mallet, and also obliquely in true lines, on which the teeth or knives are arranged as evenly and truly as is practicable. Quite a variety of arrangements of the rows of teeth, for the same purpose, might be shown, which is to cut the meat as much as is conveniently possible, and yet have the meat, with no weak places, retain its original shape and appearance, as little altered as possible. Such arrangements would be in oblique squares, triangles, and other similar forms, but with no advantages over the quincunx pattern shown.

The teeth, I have said, are round at their base, and with incisor-edges at their lower ends, as shown. But in Fig. 2 another variety of edges is seen in a few of the teeth, which have cruciform edges. It will be observed that, as said of Fig. 1, the rows parallel to the ends of the mallet are set obliquely, and in Fig. 2 this is also seen, and that the next row is obliquely set, so far as their cutting-edges are concerned, so that the outer row is at right angles in their cutting-edges to the row next to the outer row, and that the arrangement of the rows beyond the two outer end rows is the same clear across the mallet base.

Much might be said of the uses of my implement, but such advantages and uses are apparent to those skilled in the art to which it appertains.

I claim—

1. The meat-tendering mallet, made by the handle $a$, the head or weight $b$, tooth-holding base $c$, and cleaning-plate $d$, combined and arranged substantially as set forth.

2. The handle $a$, the head $b$, tooth-base $c$, and cleaning-plate $d$, when the cleaning-plate is operated by a rod or shaft, $i$, lying in a cavity in the head $b$, and extending through it, and operated by a hand-knob, or equivalent, $g$, substantially as and for the purpose set forth.

CLEMENTS T. STEPHENS.

Witnesses:
 S. J. PARKER,
 WM. J. TOTTEN.